United States Patent Office 2,870,235
Patented Jan. 20, 1959

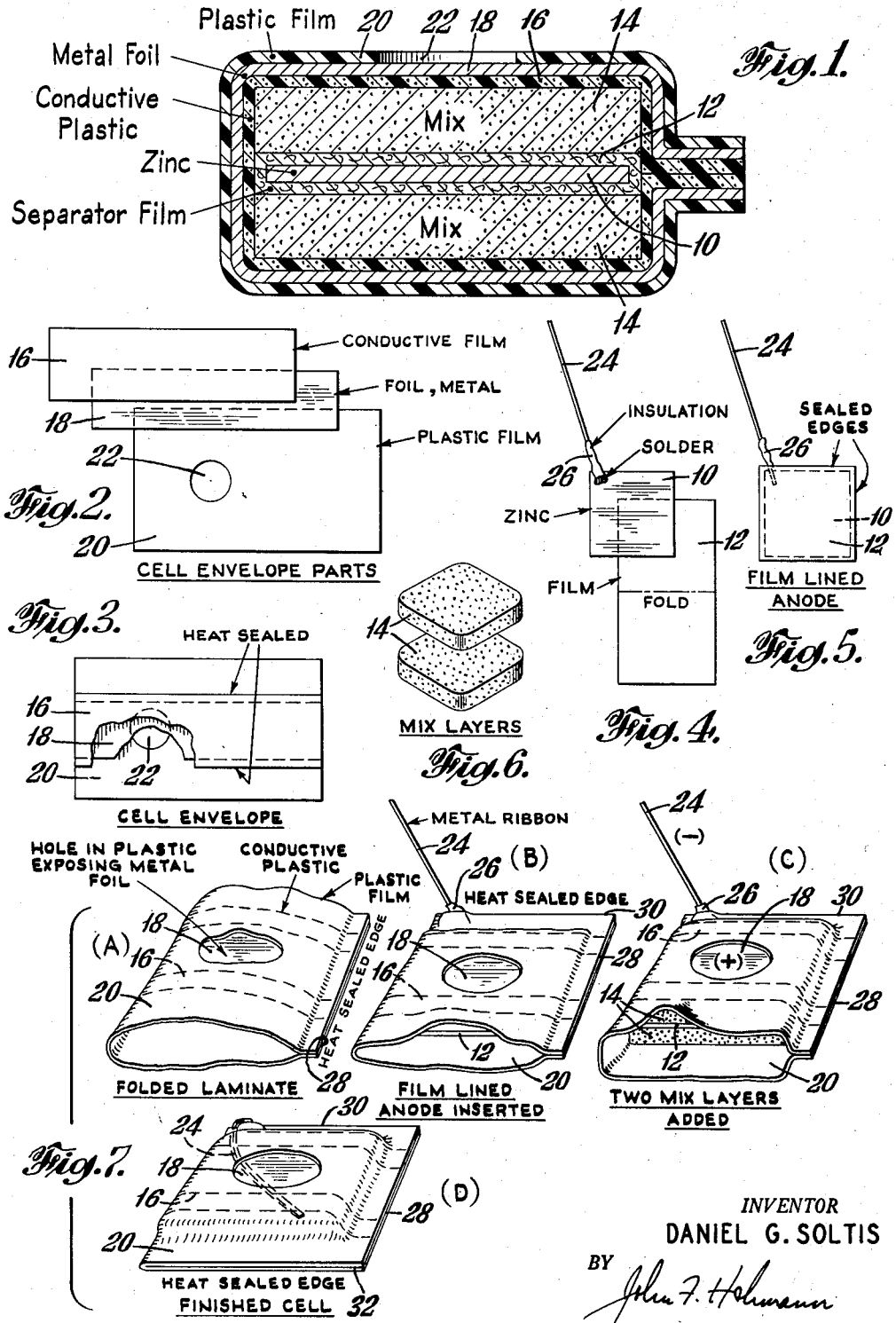

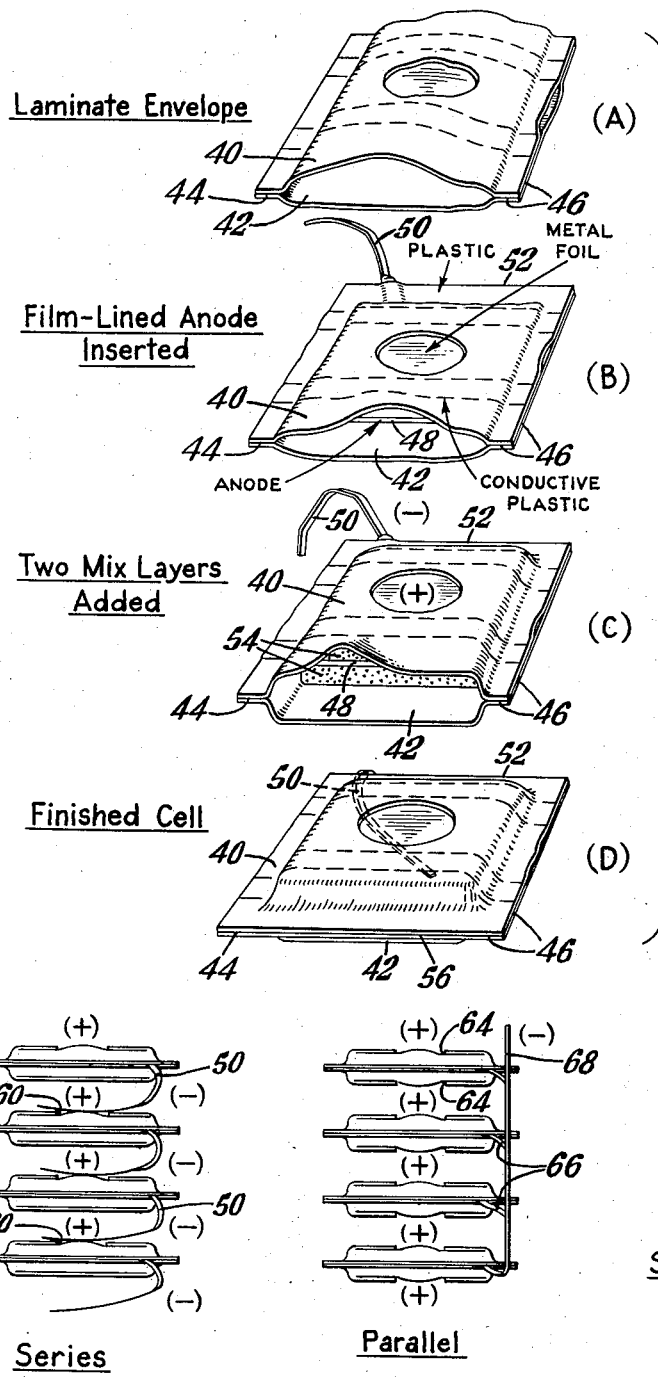
Fig. 8.
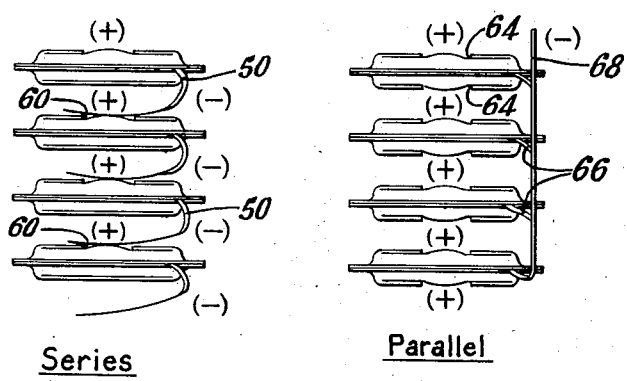
Series
Fig. 9.
Parallel
Fig. 10.
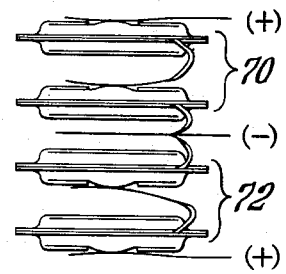
Series-Parallel
Fig. 11.
INVENTOR
DANIEL G. SOLTIS
BY
ATTORNEY

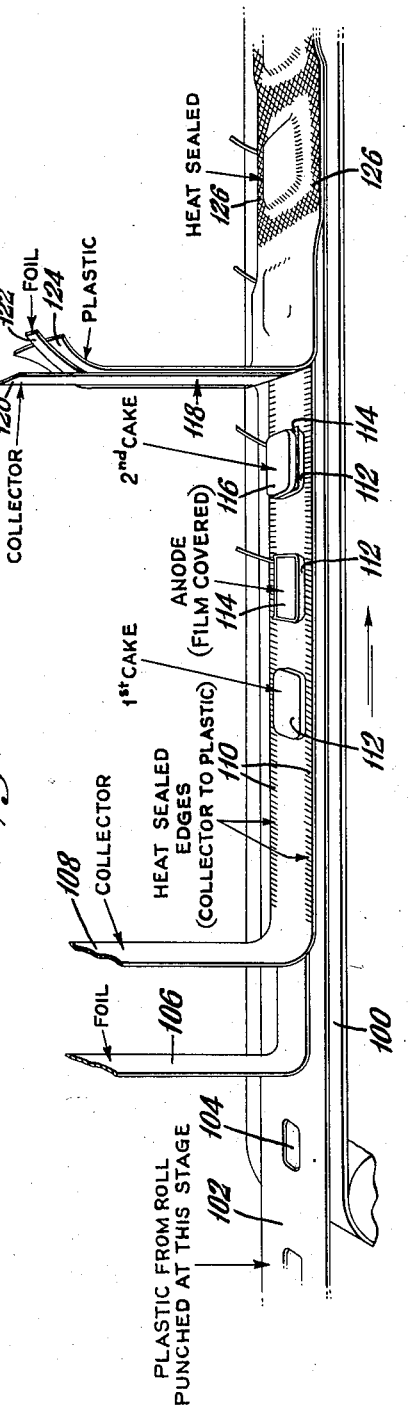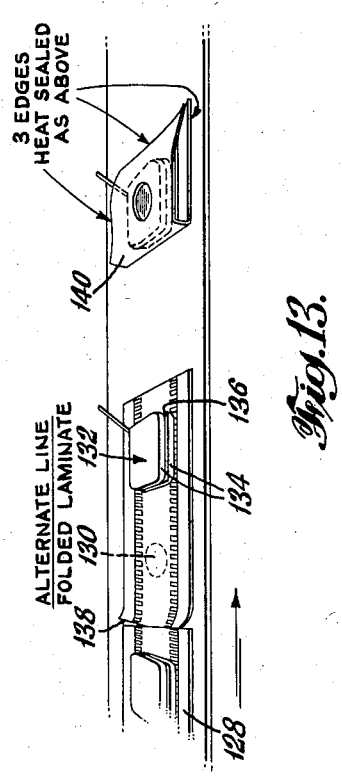

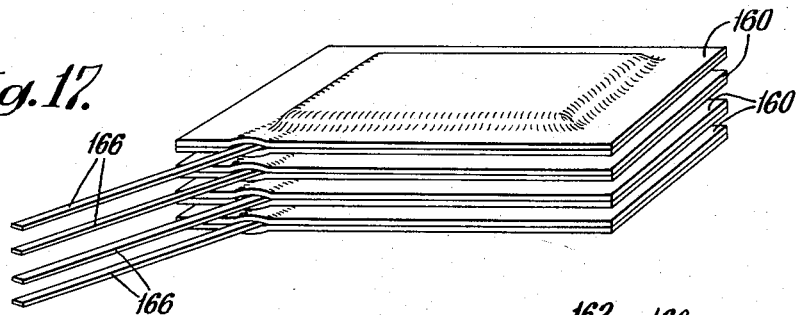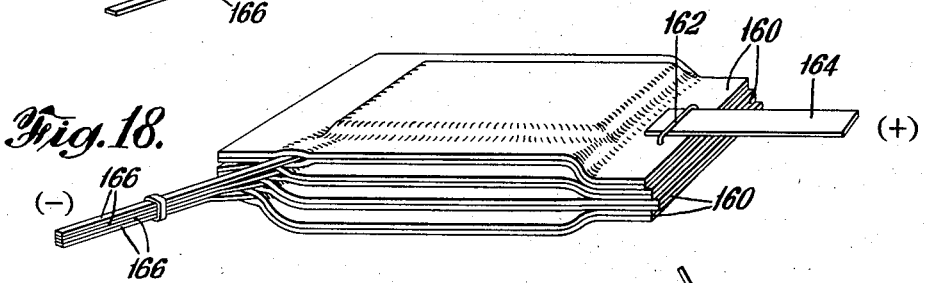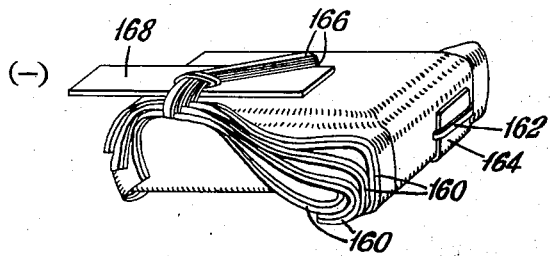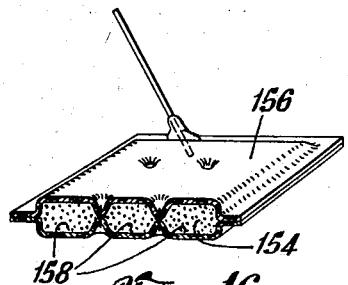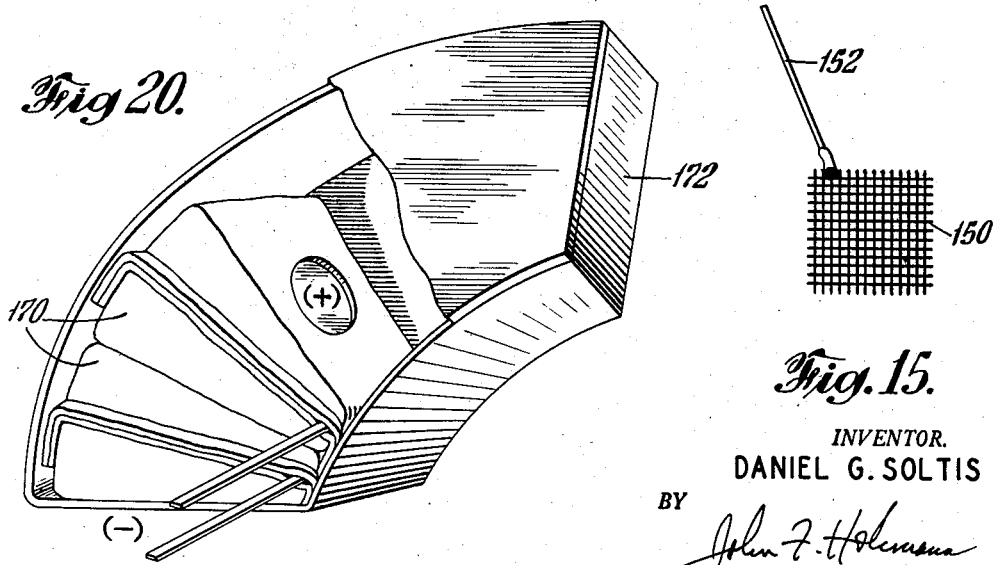

2,870,235
CATHODIC ENVELOPE CELL

Daniel G. Soltis, Cleveland, Ohio, assignor to Union Carbide Corporation, a corporation of New York Application April 9, 1956, Serial No. 577,070

15 Claims. (Cl. 136—111)

This invention relates to flat type dry cells and has particular reference to a cell of this type provided with a cathodic envelope.

As the science of electronics grows, with the development of more and more portable, electrically-powered devices, a corresponding increase in demands for energy sources for such devices is inescapable. The dry cell industry has, by the expenditure of much effort, managed to improve the characteristics of dry cells in an extraordinary manner so that batteries are available today which have tremendously improved capacities when compared with those available only a decade ago. Despite such achievements, however, demands grow apace for continued improvement both for greater capacity in batteries and, at the same time, for reduction in battery size.

The conventional flat cell battery of commerce has proved to be amenable to improvement in both directions without important changes in construction. Thus, it has been possible to decrease the volume of the depolarizer mix by using an activated depolarizer. Further improvement in capacity has been achieved by the use of a "wetter" mix, that is, one containing more electrolyte. By such modifications it has been possible to produce batteries of smaller size and greater capacity. Such improvements are not achieved without sacrifice, however. For instance, the use of an activated mix tends to decrease shelf life, and the use of a wetter mix tends to introduce manufacturing difficulties and to accentuate leakage problems. It is evident that the conventional construction has been pushed near its extremes in the absence of some major improvement in its components.

The present invention has for its principal object a cell construction which will permit more efficient utilization of cell materials. Another important object is the provision of a unit cell which lends itself to ready assembly into a battery. Another object is a cell construction having greater effective anode and cathode areas than conventional constructions. Still another object is a cell having a cathodic envelope. More specifically, the invention has for an objective a flat cell construction yielding higher output than is attainable in conventional cells of similar size.

These objects are achieved by the invention which comprises a unit flat cell in which a consumable metal anode sheet has electrolyte-wet depolarizer mix on each side of it and in which these elements are enveloped by a flexible cathode collector, the whole being sealed with a flexible, non-conducting plastic envelope.

The invention will be described with reference to the accompanying drawing, in which:

Fig. 1 is a vertical section of a cell embodying the invention;

Fig. 2 illustrates the component parts of a cell envelope for a cell embodying the invention;

Fig. 3 is a representation of an assembly of the parts shown in Fig. 2, parts being broken away;

Fig. 4 illustrates an anode and separator prior to assembly for a cell embodying the invention;

Fig. 5 illustrates an anode-separator assembly;

Fig. 6 illustrates depolarizer mix cakes for a cell;

Fig. 7 illustrates in a number of stages one manner of assembling a cell embodying the invention;

Fig. 8 is similar to Fig. 7 but shows, in stages, a slightly different cell assembly;

Fig. 9 shows a group of cells embodying the invention assembled in series relation to form a battery;

Fig. 10 is ismilar to Fig. 9 showing a parallel arrangement of cells;

Fig. 11 is similar to Figs. 9 and 10 but shows a series-parallel arrangement of cells;

Fig. 12 is a representation of a preferred procedure for assembling cells of the type shown in Fig. 8;

Fig. 13 is similar to Fig. 12, showing in part a procedure for assembling cells of the type shown in Fig. 7;

Fig. 14 is a perspective view of a battery of cells embodying the invention;

Fig. 15 is similar to Fig. 4 and illustrates a modified form of anode;

Fig. 16 illustrates yet another modified form of anode;

Fig. 17 is a perspective view illustrating a stack of cells adapted to form a battery;

Fig. 18 is similar to Fig. 17 showing another step in the assembly of a battery;

Fig. 19 is similar to Fig. 18 and shows a completed battery assembly; and

Fig. 20 is a perspective view, part being broken away, of still another battery arrangement of cells embodying the invention.

Referring particularly to Fig. 1 of the drawing, a cell embodying the invention has a consumable metal anode 10, suitably of zinc, provided with a bibulous separator 12. Depolarizer mix 14, wet with electrolyte, is provided on both sides of the anode sheet 10. These elements of the cell are contained in a laminate envelope shown in detail in Figs. 2 and 3, comprising an electrically conductive flexible cathode collector 16, suitably of a conductive plastic film material, a metal foil 18 in electrical contact with the cathode collector 16, and an outer, flexible, electrically-insulating, moisture-impervious wrapper 20 having an aperture 22 for making electrical connection to the foil 18 and thereby to the cathode collector 16. Electrical connection is made to the anode 10 by a conductor 24 (Figs. 4, 5, 7) suitably of metal in ribbon-like form secured thereto as by soldering, welding, riveting or other means. A coating 26 of electrically insulating adhesive such as a rubber compound is provided at the joint between the conductor 24 and anode 10. The relationship of the parts of the cell illustrated in Fig. 1 and of one method of assembly are shown in Figs. 2 to 7, inclusive. Thus, as shown in Fig. 2, the width of the metal foil 18 is less than that of either the conductive cathode collector 16 or of the non-conductive film 20. As shown, the non-conductive film 20 is widest of all, but it is not necessary that this be so. The width of the cathode collector film 16, however, must be at least equal to the width of the mix cakes 14. As may be seen in Fig. 3, the cathode collector 16 and outer film wrapper 20 are heat-sealed together, but the foil is not sealed to either.

The cell envelope having been formed as shown in Fig. 3 may be folded upon itself and its matching edges heat-sealed as shown at 28 in Fig. 7(A). It is pointed out that there is a continuous seal of the cell envelope at this juncture, the seal being formed between the meeting edges of the cathode collector 16 and, in this case, of the outer wrapper 20, but again the foil 18 is not sealed to either. Into the envelope may now be inserted the anode 10 which has been wrapped or "lined" with a separator 12 suitably comprising a bibulous anode-contacting material (referred to as "film") such as methyl cellulose carried on a support such as paper. The fabrication of a lined anode is visualized in Figs. 4 and 5. As is seen in Fig. 7(B), the conductor 24 extends outwardly of the envelope, the marginal edges of which may now be heat-sealed to each other as shown at 30 and to the adhesive 26 previously applied to the conductor 24. Depolarizer mix 14, which is conveniently in the form of pre-molded cakes (Fig. 6), may now be placed in the envelope (Fig. 7(C)) and the remaining unsealed marginal edge of the envelope be sealed as at 32 to complete the cell. Before completion of the seal, the envelope is partially evacuated, this procedure having been found to have a desirable effect on the cell.

A somewhat different construction is illustrated in Fig. 8. Here the cell envelope is made of two pieces 40, 42 of laminate of the type shown in Fig. 3, heat-sealed together as shown at 44, 46 (Fig. 8(A)). An anode-separator assembly 48 is inserted with a conductor 50 extending through marginal edges of the envelope which may be heat-sealed together and to the conductor as shown at 52 (Fig. 8(B)). Depolarizer mix layers 54 may now be inserted (Fig. 8(C)) and the remaining unsealed edges of the envelope sealed at 56 (Fig. 8(D)) to complete the cell after evacuation.

An outstanding advantage of the cell construction of this invention is that it makes possible assembly in a sequence that makes mechanization attractive. Figs. 12 and 13 illustrate preferred systems for assembling cells embodying the invention. Referring first to Fig. 12, assembly of a cell of the type shown in Fig. 8 is represented as being accomplished on a moving support 100. Onto the support 100 is fed first a strip of flexible, plastic, electrically non-conductive film 102 into which perforations 104 are punched at regularly spaced intervals. The film 102 eventually will form one side of the outer wrapper of the cell. A strip of metal foil 106 is next fed onto the film strip 102 followed by the introduction of a strip 108 of flexible, electrically-conductive material, eventually to serve as the cathode collector for the cell.

The edges of the strip 108 are heat-sealed to the film strip 102 as shown at 110, and at this point the laminate forming one side of the cell envelope is completed. Onto the laminate is now placed a first layer 112 of depolarizer mix. At the next station a wrapped anode-conductor assembly 114 is placed upon the mix layer 112, following which, at another station, a second layer 116 of depolarizer mix is added. At this point, a second laminate 118 comprising conductive collector material 120, foil 122, and non-conductive plastic film 124 is applied to complete the cell envelope. The laminate 118 is then heat-sealed to the laminate originally formed as shown at 126 to complete the cell. Finally, the cell is cut from the line. If the individual cells are to be stacked to form batteries, particularly parallel-connected batteries as will be described below, it will be desirable to cut multiple cell units from the line rather than single cells.

A modified procedure is illustrated in part in Fig. 13 in which cells of the type shown in Fig. 7 are produced. In this case a laminate 128 formed, for instance as shown in Fig. 12, is provided with properly spaced perforations 130, and a cell assembly 132 of depolarizer mix layers 134 and anode assembly 136 placed or formed upon it. The laminate 128 may be cut as shown at 138 and folded over the cell assembly as shown at 140 and heat-sealed at its overlapping marginal edges to complete the cell.

Modification may be made in the individual cell elements as well as in their assembly. For example, the anode may be formed of wire screen 150 (Fig. 15) having a conductor 152 secured thereto. Or, an anode 154 (Fig. 16) of extended area may be composed of powdered anode metal. The powder may be compressed or may be incorporated in a gel to stabilize it, or may be placed in an envelope 156 formed of bibulous separator material as shown. In such case, the envelope 156 may be compartmentalized as shown at 158 to prevent undue shifting of the powdered metal.

The cell of the invention is well suited for assembly into a battery. As shown diagrammatically in Figs. 9 to 11 inclusive, batteries may be assembled in series, parallel or series-parallel. To make a series-connected stack as shown in Fig. 9, the conductor 50 of one cell is bent so as to make contact through the aperture 60 of the envelope of an adjacent cell to its cathodic terminal. For the parallel connection shown in Fig. 10, the cell envelope is provided with apertures 64 on both sides so that when the cells are stacked, the cathodic terminals of each are in contact. In this arrangement of cells the anode conductor 66 of each cell is connected to a common lead 68. For series-parallel connection individual groups 70, 72 of series-connected cells are connected in parallel as shown in Fig. 11.

A simple assembly of cells in parallel arrangement is illustrated in Figs. 17 to 19, inclusive. A number of cells 160 desirably of reduced thickness compared to conventional cells is arranged in a stack. It is pointed out that in this case there need be no perforation in the cell envelopes, for a common cathodic connection is provided by a metal staple 162 driven through overlapped marginal edges of the envelopes of the stacked cells 160 and securing a conductor 164 to the stack. Individual anode leads 166 are grouped and suitably connected to a common anodic terminal 168.

The cell construction of the invention makes possible the application and maintenance of extremely heavy pressure in making a battery. In Fig. 14 a series-connected battery of cells 74 made in accordance with the invention is shown. The cells 74 are stacked in conventional manner, being inter-connected as shown in Fig. 9. An end board 76 placed at the bottom of the stack has a cathodic terminal 78 which makes contact with the cathode collector of the end cell. A similar board 80 at the top of the stack has an anode terminal 82 for the battery. The stack is assembled and maintained under heavy end-wise pressure by a metal strap 84 which embraces the bottom and two sides thereof and passes through apertures 86 in opposite sides (one side not shown) of a metal member 88 at the top of the stack. The ends of the strap are so bent as to draw the cells into close contact with each other and are crimped to prevent spring back of the cells. The assembled stack of cells may be finished in conventional manner. For example, it is desirable to provide a coating of wax on the stack in any convenient manner before applying a wrapper and label thereto.

One of the principal advantages of the cell construction of the invention is that it makes possible the production of batteries of unusual shape due to the resilience of the outer envelpoe. For instance, as shown in Fig. 20, a plurality of cells 170 of the type shown in Fig. 8(D) may be deformed to fit an arcuate container 172.

From the foregoing description, it will be observed that each cell embodying the invention is a complete unit as distinguished from many conventional flat type batteries. Moreover, each unit is completely sealed within a yieldable moistureproof envelope. Because of this construction, it is possible to utilize a much wetter mix where desired, for instance for batteries intended for use at low temperatures where experience has shown wet mixes to be necessary. An additional advantage accruing from this construction is that it makes possible the application and maintenance of very heavy end-wise pressure on a stack of cells as compared with that applied in conventional batteries without displacement of mix from the individual cells. For instance, with cells having a mix of about 2.2 square inches in cross-section, pressures of 300 pounds are applied whereas in conventional cell construction the extreme maximum pressure heretofore possible in assembling cells having substantially the same cross-sectional area has been 150 pounds. The degree of pressure applied and maintained has an important effect on battery service in that, among other things, the greater the pressure, the lower the internal resistance of the battery.

It will also be noted that in the construction of the invention both sides of the anode are in electrical contact with depolarizer mix, thus, for a given size of anode, effectively doubling the available anode surface. This makes possible extremely high current output per unit of volume. By reason of this improvement, it may not be necessary to use activated depolarizer to obtain desired current output from a battery of a given size. Contributing to this feature, of course, is that the cathodic envelope provides for greatly increased cathode collector area for a cell of given size, usually being 3 to 7 times greater than that available in cells of conventional construction.

As an example of the increased current output attainable from batteries of cells embodying the invention, a 25 volt battery of such cells produced on short circuit, a current of 6.6 amperes. Batteries of the same cross-sectional area utilizing the same mix and electrolyte, but of conventional construction, yield, under the same conditions, current averaging but 1.8 to 2.0 amperes.

Discharge characteristics of batteries of cells made in accordance with the invention represent a significant improvement over batteries of conventional construction and of the same size. In Table I below, a comparison is made between a battery of cells of the invention and a conventional battery. The test conditions (resistance load in ohms) and results (hours to cut-off voltage indicated) are reported in terms of individual cells in the battery to give a truer representation of cell characteristics although the batteries were tested as multi-cell units. The batteries save for the differences in construction were directly comparable in size and materials used. These tests were performed on newly-made batteries and were continuous.

Table I

| Resistance, Ohms/Cell | Cathodic Envelope Battery | | | Conventional Battery | | |
|---|---|---|---|---|---|---|
| | Hours to Volts Per Cell | | | Hours to Volts Per Cell | | |
| | 1.13 v. | 1.0 v. | 0.8 v. | 1.13 v. | 1.0 v. | 0.8 v. |
| 3.0 | .42 | 1.0 | 1.6 | .012 | .05 | .17 |
| 7.5 | 4.0 | 5.9 | 8.3 | .17 | .28 | .45 |
| 15.0 | 13.3 | 18.5 | 24.0 | 4.3 | 5.9 | 9.6 |
| 30.0 | 34.5 | 42.5 | 45.0 | 10.1 | 15.5 | 27.0 |
| 60.0 | 77.8 | 88.3 | 110.0 | 47.8 | 64.4 | 91.9 |
| 120.0 | 162.0 | 188.0 | 259.0 | 130.4 | 177.4 | 217.0 |
| 200.0 | 306.0 | 360.0 | 437.0 | 229.0 | 313.0 | 404.0 |
| 300.0 | 456.0 | 574.0 | 656.0 | 404.0 | 505.0 | 605.0 |

The data reported in Table I demonstrate clearly the substantial service advantages possessed by the cell of the invention particularly under heavy drain conditions, e. g. 15–30 ohms per cell. The advantage is still of the order of 100 percent over conventional batteries when discharged through resistances up to 50 ohms per cell.

This advantage makes it possible to utilize natural manganese dioxide ore depolarizers to achieve service levels not now attainable without the use of activated depolarizer. In Table II below are shown results of tests performed on batteries assembled from cells of this invention utilizing natural ore compared with conventional batteries utilizing chemically activated depolarizer. The tests were conducted and are reported like those of Table I.

Table II

| Resistance, Ohms/Cell | Cathodic Envelope Battery | | | Conventional Battery | | |
|---|---|---|---|---|---|---|
| | Hours to Volts Per Cell | | | Hours to Volts Per Cell | | |
| | 1.13 v. | 1.0 v. | 0.8 v. | 1.13 v. | 1.0 v. | 0.8 v. |
| 7.5 | 2.2 | 3.8 | 5.4 | .18 | .28 | .45 |
| 15.0 | 7.4 | 10.2 | 12.6 | 4.3 | 5.9 | 9.6 |
| 30.0 | 23.0 | 29.0 | 35.0 | 10.1 | 15.5 | 26.1 |
| 60.0 | 55.0 | 72.0 | 92.0 | 48.0 | 64.0 | 92.0 |
| 120.0 | 145.0 | 190.0 | 240.0 | 130.0 | 177.0 | 216.0 |
| 300.0 | 430.0 | 540.0 | 676.0 | 404.0 | 505.0 | 605.0 |

The tests reported in Tables I and II were conducted on cells made with zinc anodes having tinned brass conductors soldered thereto, manganese dioxide depolarizer, and ammonium chloride electrolyte. The cathode collector was a polyvinyl plastic film made conductive with carbon, the foil was aluminum, and the outer wrapper was a polyvinyl chloride resin film.

The cell construction of the invention is, of course, not limited to the use of the materials enumerated. Other metals than zinc such as magnesium, aluminum, manganese or other metals useful in a primary system may be used as the anode in the cell together with appropriate electrolyte. The conductor attached to the anode should have a surface which will not form an undesirable couple with the anode metal such as would tend to cause destruction of the connection, but with this proviso satisfied, any metal could be used. Similarly, any metal foil could be used in the cell, and since the only function of the foil is to improve linear conductivity of the cathode collector, the foil may be omitted where the conductivity of the collector is sufficiently high.

The cathode collector, as indicated above, is suitably a vinyl resin material, but any liquid-impervious, electrically conductive, flexible material resistant to chemical attack by cell components or products could be used, for instance a fabric impregnated or coated with carbon or graphite. Similarly, the outer envelope may be formed of any pliant material which is a non-conductor of electricity, which is relatively impervious to oxygen and moisture but will permit venting of gas from the cell, since the venting path from the cell is normally through the envelope. Examples of such materials include plasticized vinyl resin film, halogenated rubber compounds, vinylidene resins, cellulosic materials such as regenerated cellulose or cellulose acetate, polyethylene or polyesters of a glycol and terephthalic acid. A combination of such materials as a laminate may be desirable to produce a good outer envelope. Whatever materials are used, cell components must, of course, be compatible. For ease of assembly, it is desirable that the cathode collector and outer envelope be sealable with heat alone, although adhesive may be used in combination with heat-sealing. It is preferred that both the collector and outer envelope be of elastomeric vinyl resin film such as plasticized polyvinyl chloride compositions.

As has been stated above, the cell construction of the invention is admirably suited to the production of cells for low temperature use because of their being completely sealed in a yieldable container. This permits use of a mix containing unusually large quantities of electrolyte. Of course, such electrolyte will contain a freezing point depressant. In assembling cells with such wet mixes, it may be possible and desirable to extrude the mix into the cell envelope rather than to attempt to form it into cakes. However, in this case, too, the mix is placed on both sides of the anode sheet.

Other modifications will occur to those skilled in the battery art, and it will be apparent that the specific details of procedures followed and materials used have been given as illustrative of the principles of the invention and of the best mode of putting them into practice presently known. The invention is not limited to such details.

I claim:

1. A substantially flat unit cell comprising a consumable metal anode; electrolyte-wet depolarizer mix on both sides of said anode; a flexible, moisture impervious cathode collector in contact with said depolarizer mix; and a flexible, moisture impervious non-conductive envelope enclosing said cell, contact to said cathode collector being made through a perforation in said envelope, and a conductor attached to said anode extending outwardly of said envelope for contact to said anode, said collector being marginally sealed to said envelope and overlapping portions thereof being sealed to themselves, thus forming a moisture impervious closure for said cell, the emergent portion of said conductor being sealed in said closure to prevent escape of moisture therefrom.

2. A cell of the construction defined by claim 1 in which a metal foil is interposed between said cathode collector and said envelope.

3. A flat primary galvanic cell having a consumable metal anode having a conductor attached thereto; a bibulous separator enclosing said anode; depolarizer mix containing electrolyte on both sides of said anode; a pliant, moisture impervious cathode collector in contact with said depolarizer mix; and a pliant, electrically non-conductive envelope enclosing said cell, said collector being marginally sealed to said envelope and overlapping portions thereof being sealed to themselves, said envelope having an aperture therein for making electrical contact to said collector and being substantially impervious to moisture and oxygen but providing a path for venting gas from the cell, and said conductor extending outwardly of said envelope but having its emergent portion sealed thereto, thereby preventing escape of moisture therefrom.

4. A cell of the construction defined by claim 3 in which a metal foil is interposed between said cathode collector and said envelope.

5. A cell of the construction defined by claim 4 in which both said collector and said envelope are composed of a vinyl resin.

6. A cell of the construction defined by claim 5 in which said anode is zinc and said depolarizer mix is manganese dioxide.

7. A battery of substantially flat unit cells of the construction defined by claim 1 assembled into a stack wherein the conductor attached to the anode of each cell makes contact with the cathode collector of an adjacent cell through the perforation in the envelope of said adjacent cell, which stack is maintained under heavy endwise pressure by a metal strap.

8. A battery of flat unit cells each contained in a pliant, sealed, moisture proof envelope having a cathodic conductor therein and an anodic conductor extending therefrom, said cathodic conductors being interconnected by a conductive metal connector holding said cells together, said anodic conductors being connected to a common terminal.

9. In combination in a substantially flat dry cell a consumable metal anode, electrolyte-wet depolarizer mix on both sides thereof, and a sealed envelope enclosing said cell, said envelope comprising a flexible, moistureproof cathode collector marginally sealed to an electrically non-conductive, moistureproof, pliant wrapper and to itself in overlapping portions.

10. The combination defined in claim 9 wherein said anode is composed of metal powder and is contained in a bibulous envelope.

11. In combination in a substantially flat dry cell a consumable metal anode, electrolyte-wet depolarizer mix on both sides thereof, and a sealed envelope enclosing said cell, said envelope comprising a flexible, moistureproof cathode collector and a moistureproof outer wrapper of substantially equal length, said wrapper being wider than said collector, said collector being so arranged with respect to said wrapper as to leave margins at one pair of opposite edges of said collector, said collector being sealed to said wrapper at said edges to form a laminate; said envelope being formed of two laminate portions having marginal contact areas; said portions being sealed to each other at said marginal contact areas.

12. The combination defined in claim 11 in which said envelope is formed of a single laminate sheet folded upon itself and enclosing said cell elements.

13. The combination defined in claim 11 in which said envelope is formed of two laminate sheets.

14. The combination defined in claim 11 in which a metal foil is interposed between said collector and said wrapper.

15. The method of manufacturing flat primary galvanic cells which comprises providing a laminate comprising an outer wrapper and an inner, electrically-conductive cathode collector; placing upon said collector a layer of depolarizer mix wet with electrolyte, such layer being of lesser width than said wrapper; placing a wrapped anode upon said mix; placing a second layer of depolarizer mix upon said anode sheet; placing another portion of laminate upon said second layer of depolarizer mix with its collector adjacent thereto; and sealing said second portion of laminate to said first mentioned laminate.

References Cited in the file of this patent

UNITED STATES PATENTS

| 2,501,673 | Glassner | Mar. 28, 1950 |
| 2,605,299 | Teas | July 29, 1952 |
| 2,635,128 | Arbogast | Apr. 14, 1953 |
| 2,745,894 | Nowotny | May 15, 1956 |

FOREIGN PATENTS

| 495,667 | Canada | Sept. 1, 1953 |